US010747763B2

(12) United States Patent
Attaluri et al.

(10) Patent No.: US 10,747,763 B2
(45) Date of Patent: Aug. 18, 2020

(54) EFFICIENT MULTIPLE AGGREGATION DISTINCT PROCESSING

(71) Applicant: International Business Machines Corporation, Armonk, NY (US)

(72) Inventors: Gopi K. Attaluri, San Jose, CA (US); Ronald J. Barber, San Jose, CA (US); Vincent Kulandaisamy, Portland, OR (US); Vijayshankar Raman, Sunnyvale, CA (US); Liping Zhang, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 15/152,333

(22) Filed: May 11, 2016

(65) Prior Publication Data

US 2017/0329823 A1 Nov. 16, 2017

(51) Int. Cl.
*G06F 16/2453* (2019.01)
(52) U.S. Cl.
CPC .. *G06F 16/24537* (2019.01); *G06F 16/24542* (2019.01)
(58) Field of Classification Search
CPC .............. G06F 17/30454; G06F 17/30463
USPC ........................................... 707/718
See application file for complete search history.

(56) References Cited

U.S. PATENT DOCUMENTS

| 6,430,550 | B1 * | 8/2002 | Leo ..................... G06F 16/2455 707/623 |
| 6,775,682 | B1 | 8/2004 | Ballamkonda et al. |
| 7,035,843 | B1 * | 4/2006 | Bellamkonda .... G06F 16/24556 |
| 7,392,359 | B2 | 6/2008 | Ben-Zvi |
| 7,792,823 | B2 | 9/2010 | Cain et al. |
| 8,005,868 | B2 | 8/2011 | Saborit et al. |

(Continued)

FOREIGN PATENT DOCUMENTS

WO WO-2013172821 A1 * 11/2013 ........... G06F 16/285

OTHER PUBLICATIONS

Srikanth, "Method and Algorithm for Accelerating Binary Search of Large Tables using Comparable Memory through a Multilevel Hash-Index", Oct. 7, 2011, pp. 1-9, Yahoo!, IP.com, United States.

(Continued)

*Primary Examiner* — Pierre M Vital
*Assistant Examiner* — Alicia M Antoine
(74) *Attorney, Agent, or Firm* — Sherman IP LLP; Kenneth L. Sherman; Steven Laut (57) ABSTRACT

A computer program product provides efficient multiple aggregation distinct processing. The computer program product including a computer readable storage medium having program instructions embodied therewith. The program instructions are executable by a processor to cause the processor to convert a query with multiple aggregation distincts into a two-stage group-by process using a nest operator. The two-stage group-by process including further program instructions to cause the processor to: perform a first stage group-by process including the nest operator taking a single input row, and concatenating a grouping key with a measure value for each aggregation distinct that forms multiple inputs to a single group-by table, and perform a second stage group-by process including the nest operator bringing together entries for each original group.

17 Claims, 8 Drawing Sheets

(56) References Cited

U.S. PATENT DOCUMENTS

| | | | |
|---|---|---|---|
| 2006/0230017 A1* | 10/2006 | Larson | G06F 17/30457 |
| 2013/0013585 A1 | 1/2013 | Graefe | |
| 2013/0132352 A1 | 5/2013 | Kaushik et al. | |
| 2015/0248462 A1* | 9/2015 | Theeten | G06F 17/30516 |
| | | | 707/688 |
| 2016/0070451 A1* | 3/2016 | Kim | G06F 3/04842 |
| | | | 715/765 |
| 2016/0103882 A1* | 4/2016 | Deshmukh | G06F 17/30442 |
| | | | 707/770 |
| 2016/0378827 A1* | 12/2016 | Bondalapati | G06F 17/30463 |
| | | | 707/718 |
| 2017/0024435 A1* | 1/2017 | Kociubes | G06F 17/30292 |
| 2017/0147623 A1* | 5/2017 | Schildt | G06F 16/2365 |
| 2017/0147636 A1* | 5/2017 | Weyerhaeuser | G06F 16/24554 |
| 2017/0193054 A1* | 7/2017 | Tang | G06F 16/2458 |
| 2017/0228425 A1* | 8/2017 | Kandula | G06F 17/30463 |
| 2017/0262503 A1* | 9/2017 | Bellamkonda | G06F 17/30463 |
| 2017/0286454 A1* | 10/2017 | Saeki | G06F 16/248 |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

\* cited by examiner

```
┌─────────────────────────────────────┐
│          Query Unit                 │
│                                     │
│            610                      │
├─────────────────────────────────────┤
│   Re-Write Query Conversion Unit    │
│                                     │
│            620                      │
│   ┌─────────────────────────────┐   │
│   │    Stage 1 Group-By Unit    │   │
│   │            625              │   │
│   └─────────────────────────────┘   │
│                                     │
│   ┌─────────────────────────────┐   │
│   │    Stage 2 Group-By Unit    │   │
│   │            626              │   │
│   └─────────────────────────────┘   │
└─────────────────────────────────────┘
```

EFFICIENT MULTIPLE AGGREGATION DISTINCT PROCESSING

BACKGROUND

Aggregate functions perform a calculation on a set of values and return a single value. Aggregation distinct is common and an important type of analytics. A single aggregation distinct in a query is fairly easy to handle. But a query process that simultaneously performs multiple aggregation distincts is very challenging for current information management systems, especially for Big Data tasks that may include querying data having millions or billions of rows/columns of data.

SUMMARY

Embodiments relate to conversion of multiple aggregation distincts to a multi-stage group-by process. One embodiment includes a computer program product that provides efficient multiple aggregation distinct processing. The computer program product including a computer readable storage medium having program instructions embodied therewith. The program instructions are executable by a processor to cause the processor to convert a query with multiple aggregation distincts into a two-stage group-by process using a nest operator. The two-stage group-by process including further program instructions to cause the processor to: perform a first stage group-by process including the nest operator taking a single input row, and concatenating a grouping key with a measure value for each aggregation distinct that forms multiple inputs to a single group-by table, and perform a second stage group-by process including the nest operator bringing together entries for each original group.

These and other features, aspects and advantages of the present invention will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments provide for efficient multiple aggregation distinct processing. The embodiments provide a rewrite, which converts a query with multiple aggregation distincts into a group-by, using a nest operator. The nest operator is an n-ary operator that takes a single input row, and by suitably "concatenating" the grouping key with the measure value for each aggregation distinct (along with an indicator of which measure was included), forms multiple inputs to a single group-by table (e.g., a hash table) (this group-by is performed on the original grouping columns, plus the concatenation). Then a final group-by is performed (on the original grouping column(s) alone) to bring together the entries for each original group.

In one or more embodiments, the conversion of aggregation distincts to a two-stage group-by process reduces memory consumption and improves query performance, especially with Big Data, such as a billion distinct forms of data (e.g., databases or storage forms for people in a country, a large organization, users across social media platforms, etc.).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
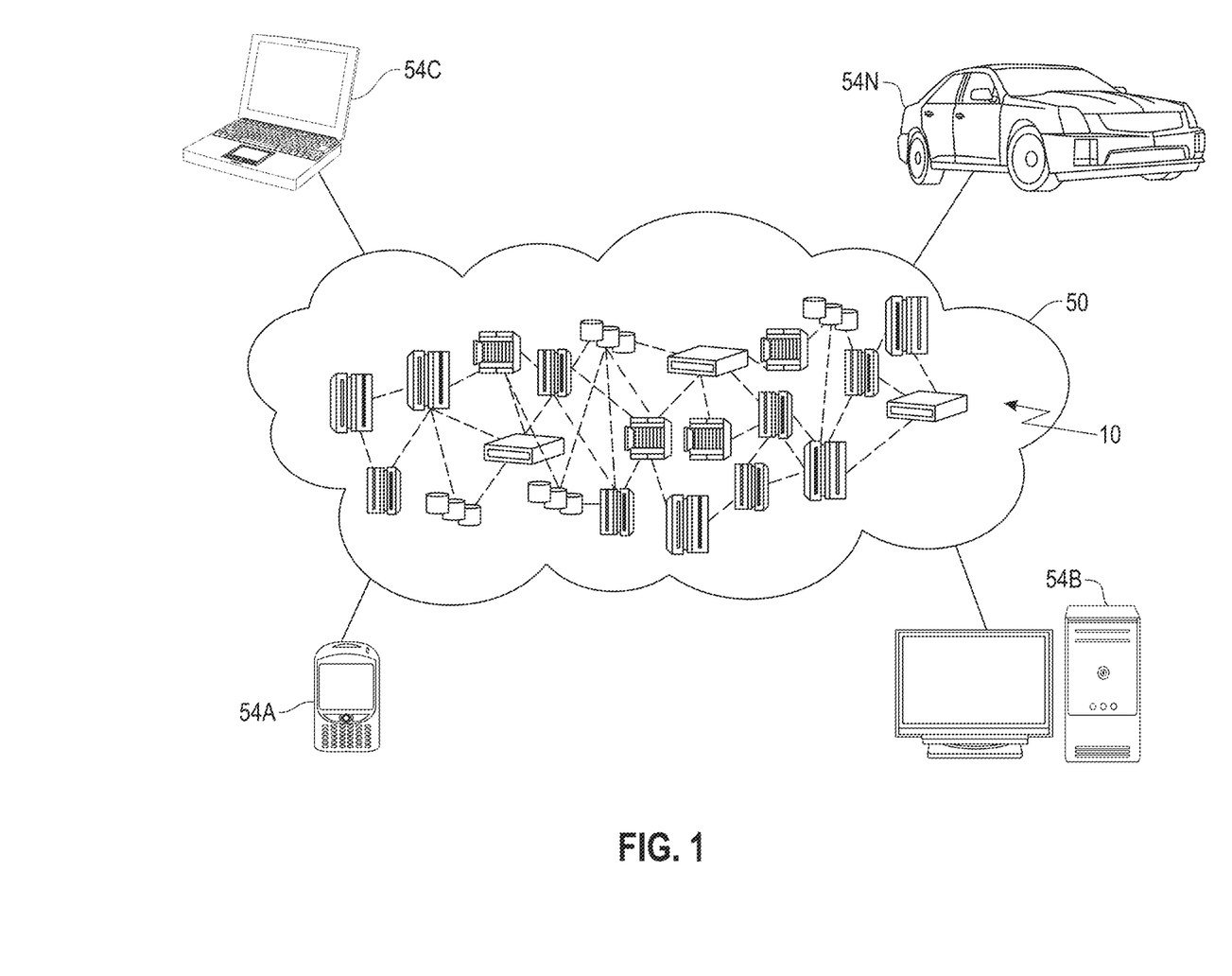
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
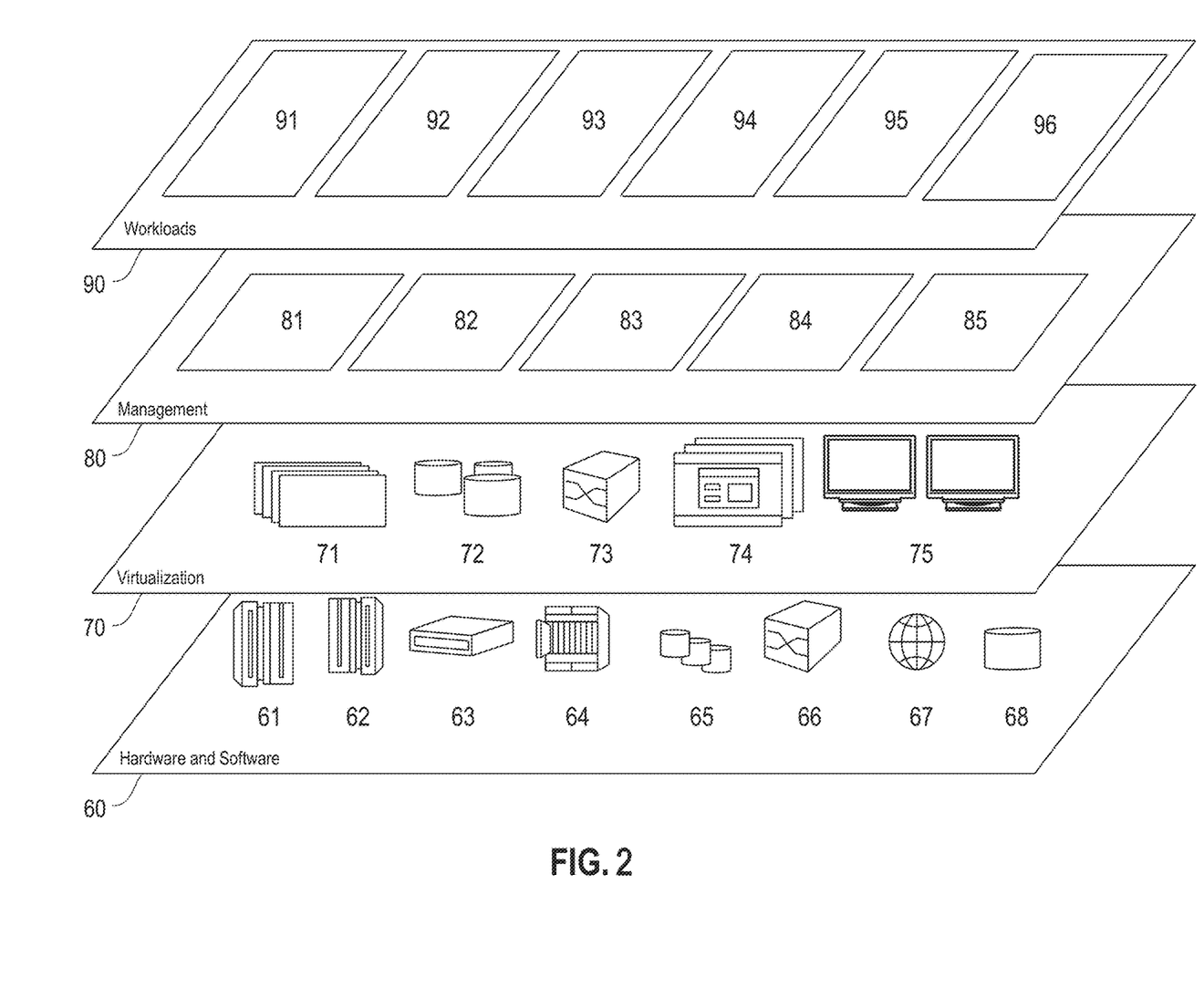
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and efficient multiple aggregation distinct processing 96. As mentioned above, all of the foregoing examples described with respect to FIG. 2 are illustrative only, and the invention is not limited to these examples.

It is understood all functions of one or more embodiments as described herein may be typically performed in the computing environment 50 (FIG. 1), the network 300 (FIG. 3), performed by the system 400 (FIG. 4), the query device 510 or client device 520 (FIG. 5), or the device 600 (FIG. 6), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
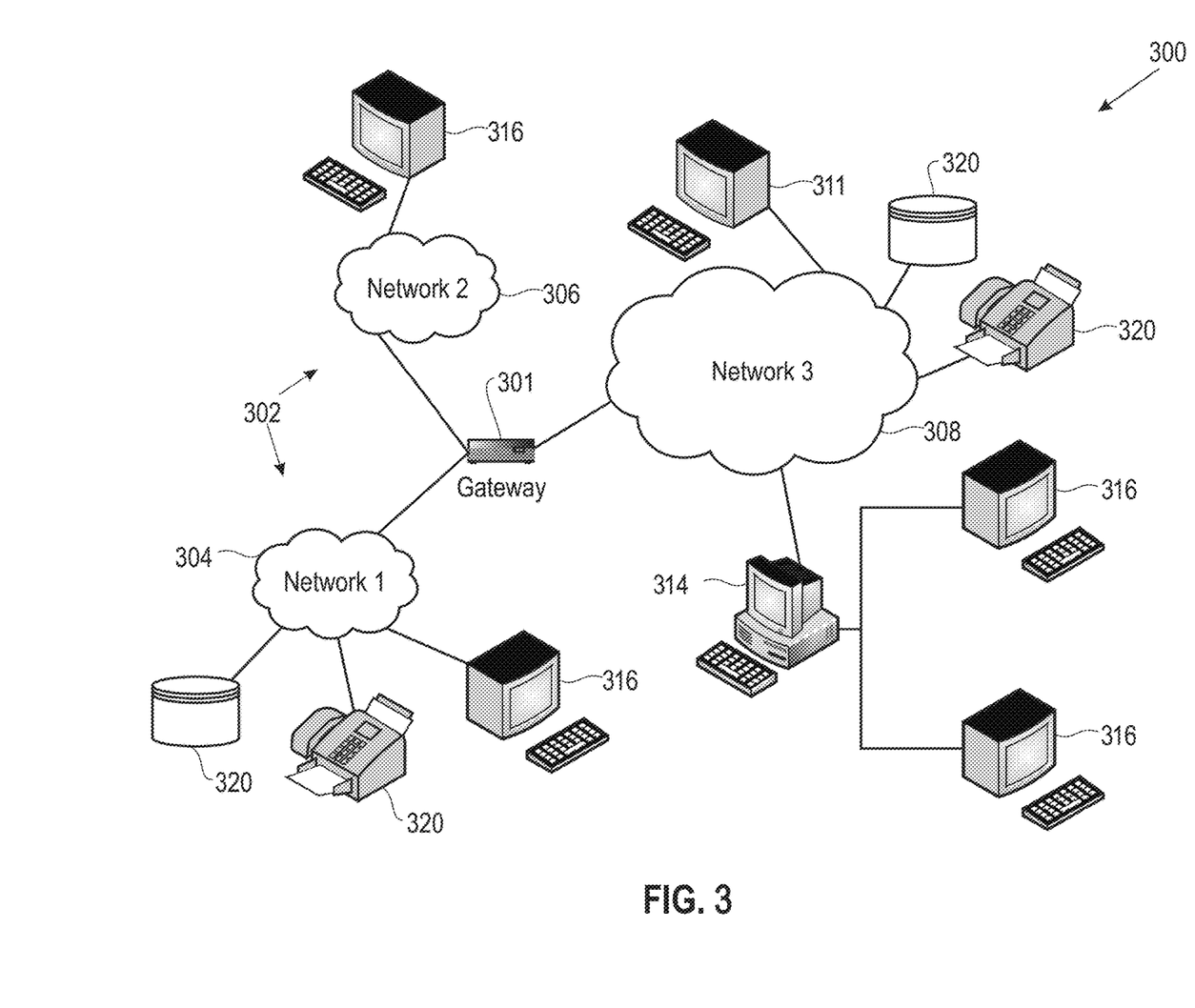
FIG. 3 is a network architecture for efficient multiple aggregation distinct processing, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
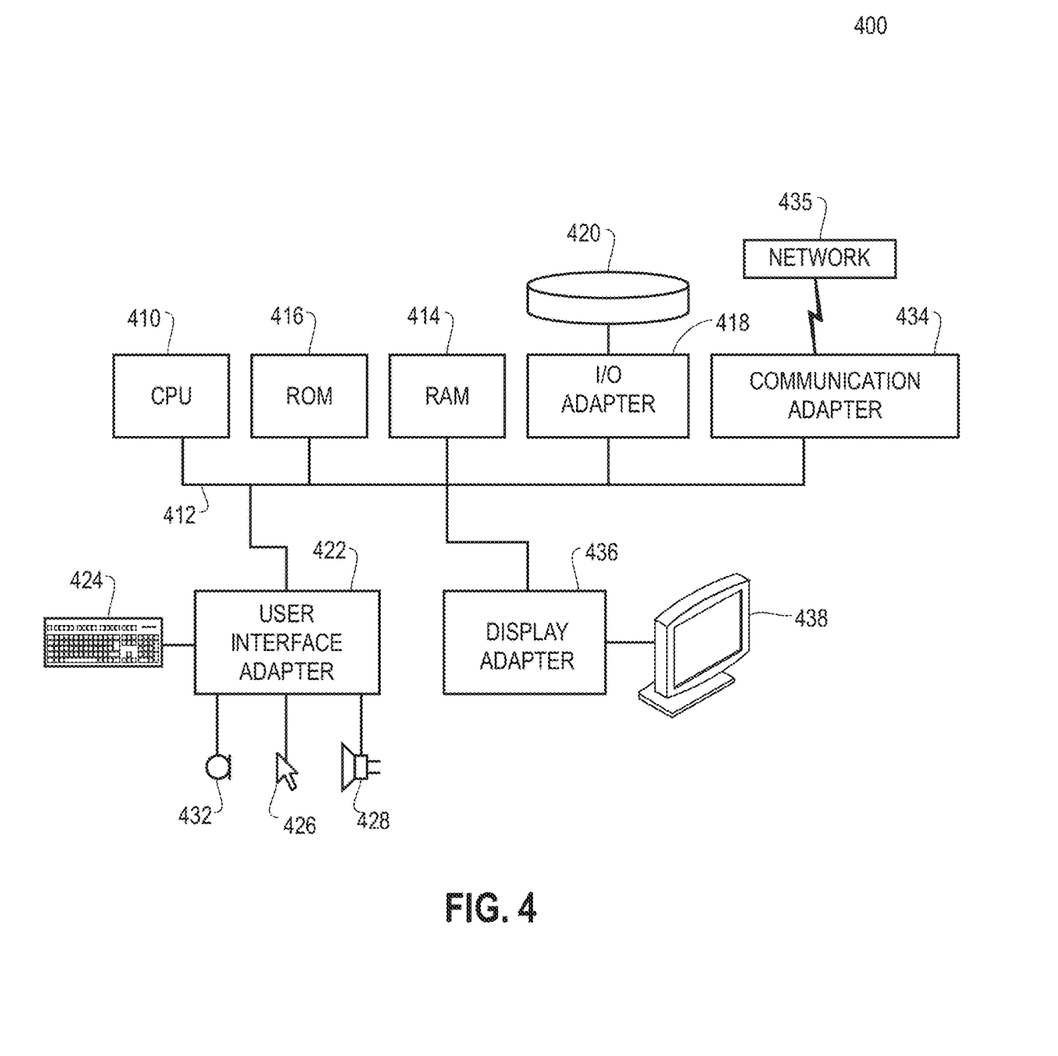
FIG. 4 shows a representative hardware environment that may be associated with the servers and/or clients of FIG. 3, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
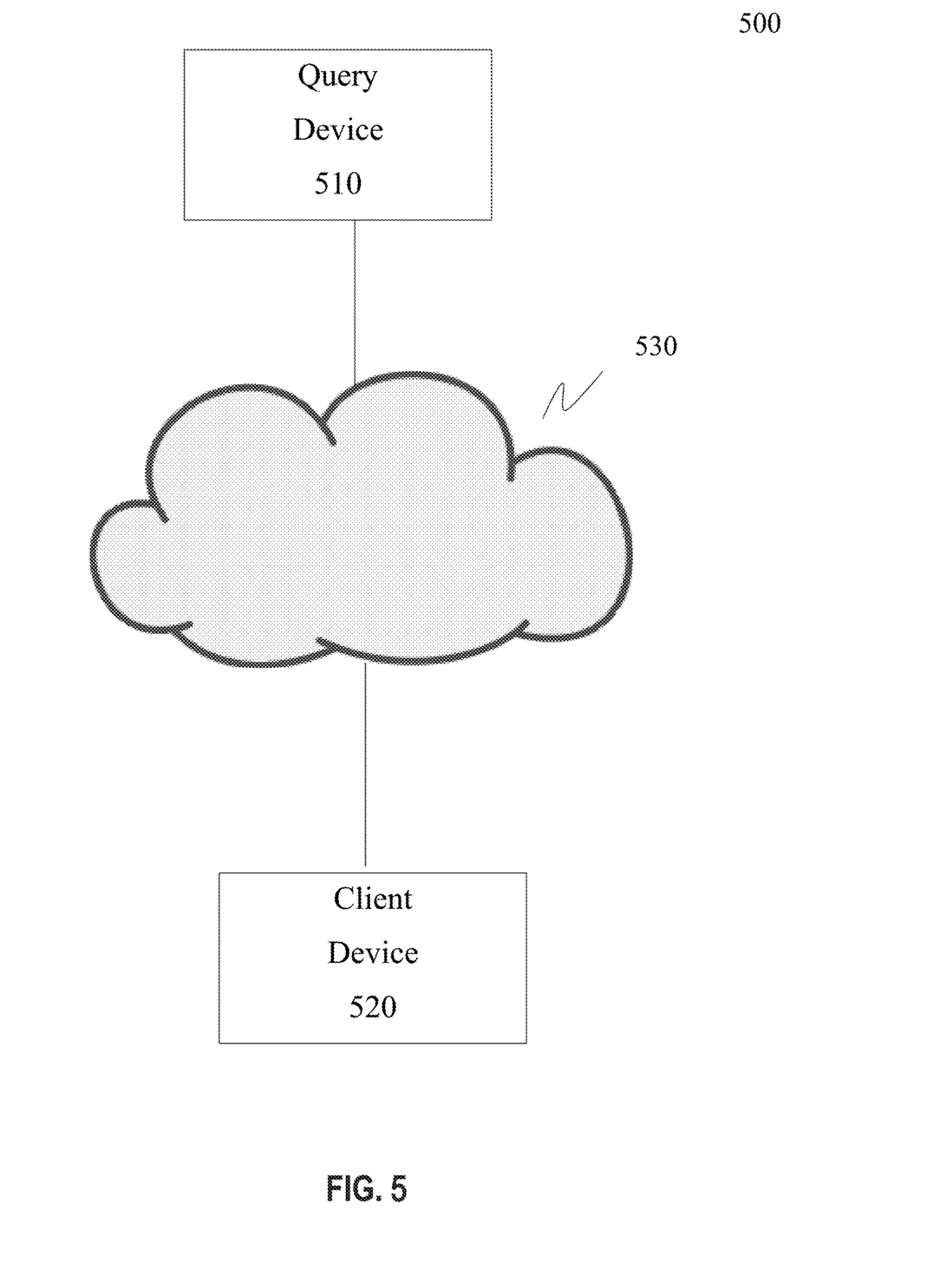
FIG. 5 is a block diagram showing an example query system using efficient multiple aggregation distinct processing, according to an embodiment.

FIG. 5 is a block diagram showing an example query system 500 using efficient multiple aggregation distinct processing, according to an embodiment. In system 500, a user may use an application, device or interface executing on a client device 520 to send/transmit a search query to a query device 510 using a network 530 (e.g., the Internet) and obtain query results from the search device. In one example, the client device 520 may be a portable computing device (e.g., a laptop computer, a tablet, etc.), a desktop computer, a mobile computing device (e.g., a smart phone, a wearable device, etc.). The application may be an application program, an application programming interface (API) or a browser-based application configured to communicate with the query device 510. The query device 510 includes a query engine operated by a service provider, an enterprise network, etc. In one example, the query engine may cooperate with other components, such as a search index and/or database to provide search results. The query device 510 further includes one or more additional processing components to perform additional processing on the query results of the query engine and provide, for example, location-based results. Details of the processing are described below. In one embodiment, the query device 510 may be implemented as a standalone device (e.g., a single server) or a distributed device (e.g., multiple servers or virtual machines operating on multiple processing cores communicating with each other and cooperating to provide the query results).

Figure 6:
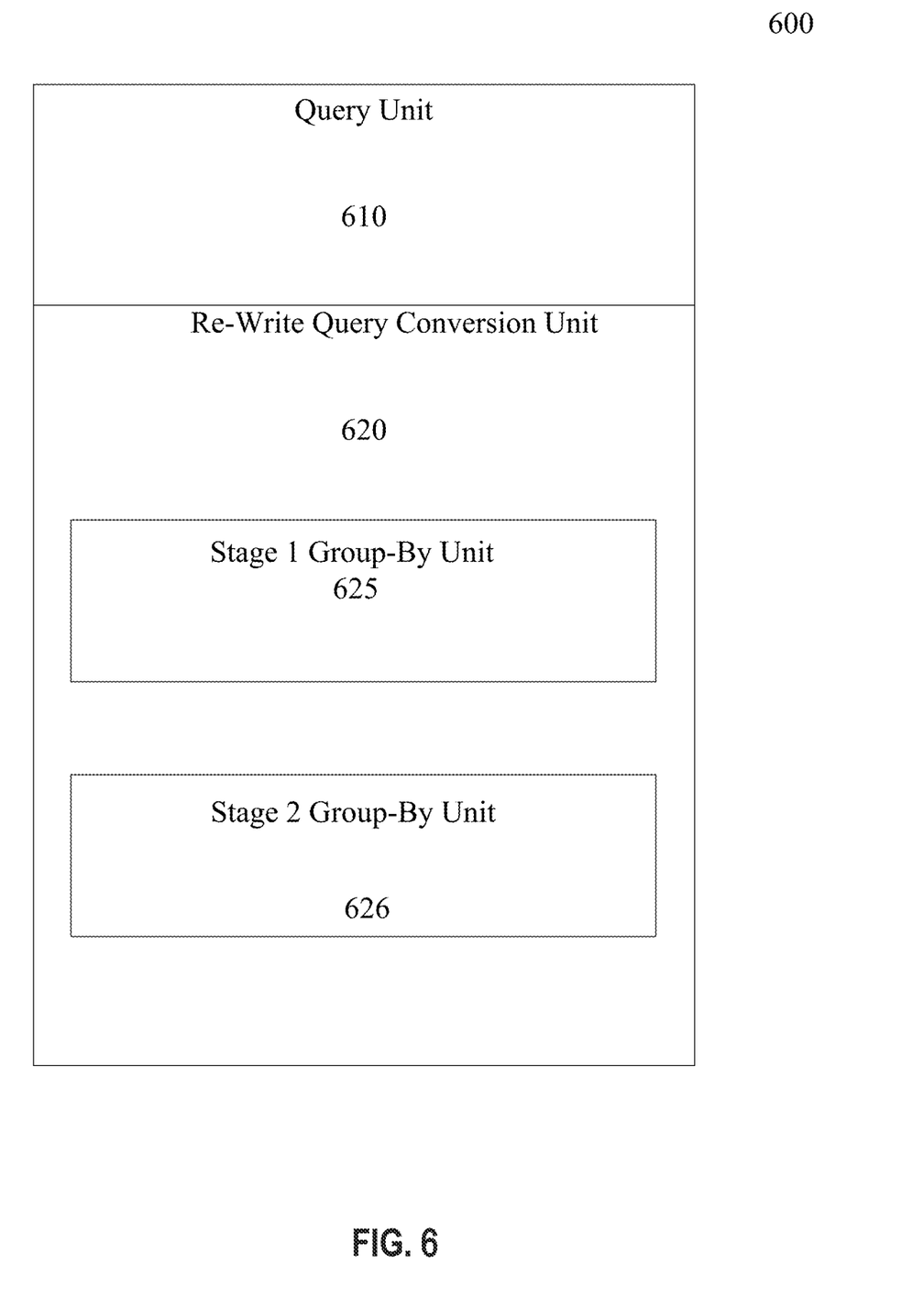
FIG. 6 is a device for efficient multiple aggregation distinct processing, according to an embodiment.

FIG. 6 shows a device 600 for efficient multiple aggregation distinct processing, according to an embodiment. In one example, the device 600 may be deployed in a client device (e.g., client device 520, FIG. 5) or a query device 510, split between the two devices, distributed in cloud computing environment 50 (FIG. 1) using one or more cloud computing nodes 10, in the system architecture 300 (FIG. 3) or in hardware system 400 (FIG. 4). In one example, the device 600 may be implemented as an application specific integrated circuit (ASIC), or any other type of IC. In one embodiment, the device 600 includes a query unit 610 and a re-write query conversion unit 620 that includes a stage 1 group-by unit 625 and a stage 2 group-by unit 626. In one example, the query unit 610 provides an interface to receive queries as input to the device 600. In one example, the re-write query conversion unit converts a query with multiple aggregation distincts into group-by processing using a nest operator. The following examples are described for ease of understanding and are not limiting for the embodiments.

In one example, suppose the query received or generated with the query unit 610 is the query using: select (count distinct A), (count distinct B), sum(X)//. Note that while the example uses count, the embodiments may be generally applied to other queries from group-by G. In this example, and generally, the rewrite is performed by the re-write query conversion unit 620 in two stages using the stage 1 group-by unit 625 and the stage 2 group-by unit 626 as follows. The stage 1 group-by unit 625 performs:

select G, NaryFunction( ), sum(X) from . . .
    group-by G, NaryFunction( ).

The NaryFunction( ) is multi-valued user defined function (UDF) that nests (i.e., a nest operator) the fields 'A' and 'B' (in this example), into separate rows, such that a given row of the input is aggregated into three groups: one for the G|A and one for the G|B, and one for the base G. In this example, the stage 1 group-by unit 625 takes (as input) a single row with values X_1, G_1, A_1, B_1 (for columns X, G, A, B respectively). The NaryFunction produces three rows: one with G_1, "ColA"|A_1.asString( ) (and no aggregation payload), another with G_1, "ColB"|B_1.asString( ) (and no aggregation payload), and another with G_1, null, aggregation payload X. All three are fed into the group-by using the stage 1 group-by unit 625. The stage 1 group-by unit 625 converts both A and B into strings to unify the data type. It should be noted that the stage 1 group-by unit 625 unifies into other types as well, if A and B are from similar data types. One benefit of the processing by the stage 1 group-by unit 625 is that a complex aggregation distinct is reduced to just a single, two-stage group-by the re-write query conversion unit 620.

Continuing with the example, at the end of the stage 1 group-by 625 processing, the group-by result is further processed by the stage 2 group-by unit 626 to process the "aggregation distinct." In one embodiment, the "aggregation distinct" processing includes the stage 2 group-by unit 626 performing a group-by on G (no distinct). In this example. The stage 2 group-by unit 626 separately computes a simple count( ) on the A and B parts of each group. In this example, the overall processing (showing both stage 1 and stage 2) may be represented as:

select G,
    // this computes sum(sumX) over the rows where Nary.columnName=null. Note that the filter is not needed if sumX is treated as 0 when not present.
    sum(case Nary.columnName when null then sumX else 0)
    // this computes count(*) where Nary.columnName='ColA',
    sum(case Nary.columnName when 'ColA' then 1 else 0)
    // this computes count(*) where Nary.columnName='ColAB',
    sum(case Nary.columnName when 'ColB' then 1 else 0)
from
    (select G, NaryFunction( ) as Nary, sum(X) as sumX from . . .
    group-by G, NaryFunction( ))
group-by G.

Note that both the group-by processes may be performed with multiple schemes, such as parallel processing, map-reduce processing and shared-nothing processing. One optimization performed includes during the first group-by performed by the stage 1 group-by unit 625, partitioning is performed across parallel nodes in a way that clusters elements by the G values, which improves efficiency for the processing performed by the stage 2 group-by unit 626.

In one embodiment, the re-write query conversion unit 620 may provide processing for a general solution. In one example, suppose that a query received or generated with the query unit 610 is the query using: select (distinct aggregate Alpha on col A), (distinct aggregate Beta on col B), aggregate Gamma on col X)

from . . . group-by G.

In one embodiment, the re-write query conversion unit 620 performs processing represented as the following using the stage 1 group-by unit 625 and the stage 2 group-by unit 626:

select G, Gamma.combiner(case Nary.columnName when null then gammaX else 0), Alpha.combiner(case Nary.columnName when 'ColA' then Alpha.atomic else 0), Beta.combiner(case Nary.columnName when 'ColB' then Beta.atomic else 0)
from
    (select G, NaryFunction( ) as Nary, Gamma(X) as gammaX from . . .
    group-by G, NaryFunction( ))
group-by G.

Here, Gamma.combiner, Alpha.combiner, and Beta.combiner are the functions for combining partial aggregates, as per the Gamma, Alpha, Beta aggregate functions respectively. Alpha.atomic and Beta.atomic are one (1) for count and Nary.value, otherwise—i.e., this is the value that is aggregated each time by the corresponding aggregate function.

Figure 7:
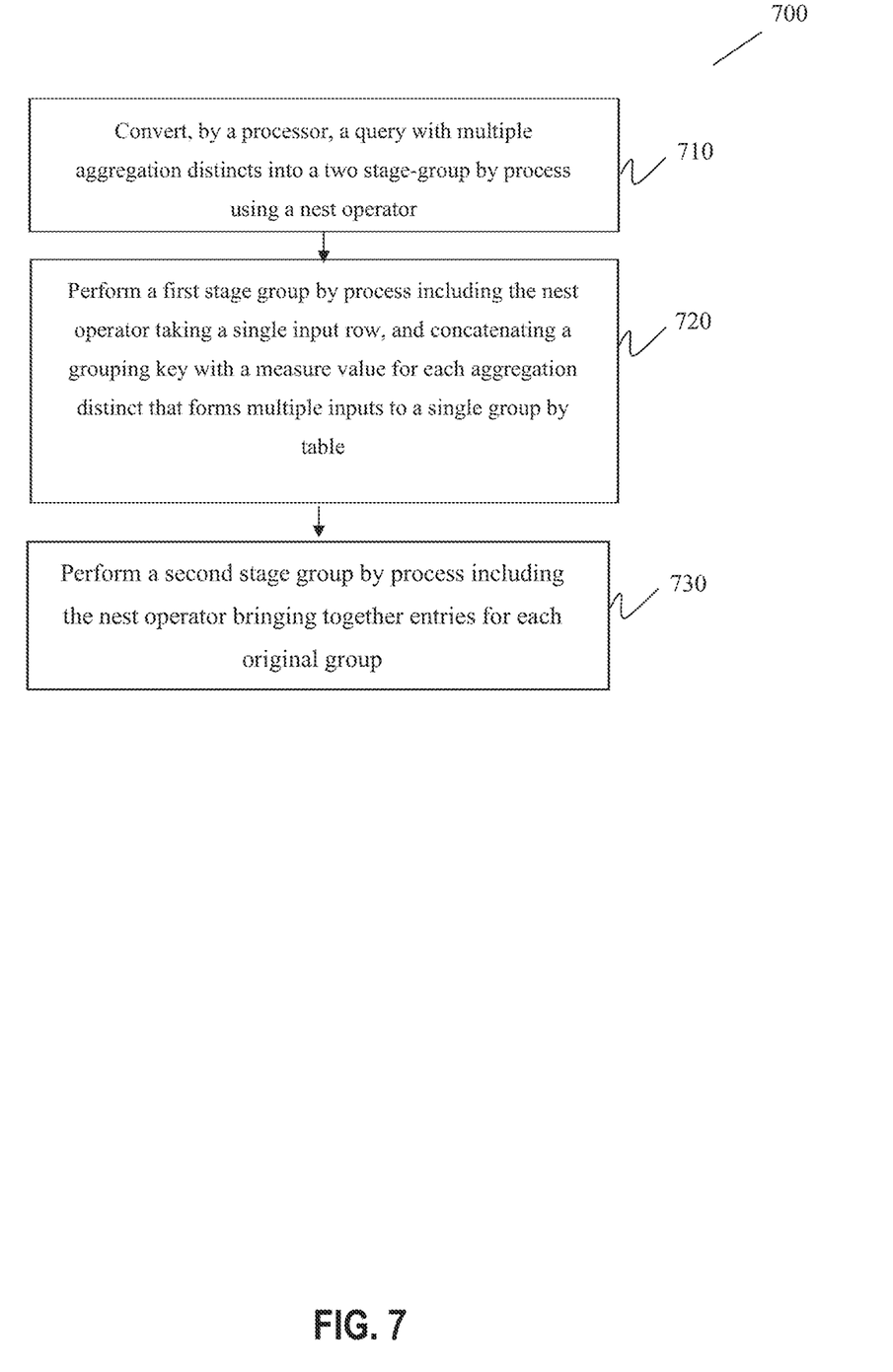
FIG. 7 illustrates a block diagram of a process for efficient multiple aggregation distinct processing, according to one embodiment.

FIG. 7 illustrates a block diagram of a process 700 for efficient multiple aggregation distinct processing, according to one embodiment. The process 700 includes a computer program product for efficient multiple aggregation distinct processing (e.g., computing environment 50, FIG. 1, network 300, FIG. 3). The computer program product includes a computer readable storage medium having program instructions embodied therewith. In block 710, the program instructions are executable by a processor (e.g., a processor in CPU 410, FIG. 4, a processor in the hardware and software layer 60, FIG. 2, a processor within the device 600, etc.) to cause the processor to convert a query with multiple aggregation distincts into a two-stage group-by process using a nest operator. The two-stage group-by process includes further program instructions to cause the processor perform block 720, which includes performing a first stage group-by process including the nest operator taking a single input row, and concatenating a grouping key with a measure value for each aggregation distinct that forms multiple inputs to a single group-by table. In block 730 the processor performs a second stage group-by process including the nest operator bringing together entries for each original group.

In one embodiment, process 700 may provide that the concatenating further includes concatenating the grouping key with the measure value and an indicator of which measure was included. Process 700 may also include that the first stage group-by process is performed on an original grouping plus the concatenation, and that the second stage group-by process is performed on one or more original grouping columns alone to bring together entries for each original group.

In one embodiment, the nest operator comprises an N-ary multi-valued defined function that nests input fields into separate rows such that a particular row of the input is aggregated into multiple groups based on a number of data groups in the input. In one embodiment, process 700 may include that the first stage group-by process includes partitioning across parallel nodes by clustering elements by the group values for improving efficiency for the second group-by stage. In one embodiment, the single group-by table comprises a hash table.

Figure 8:
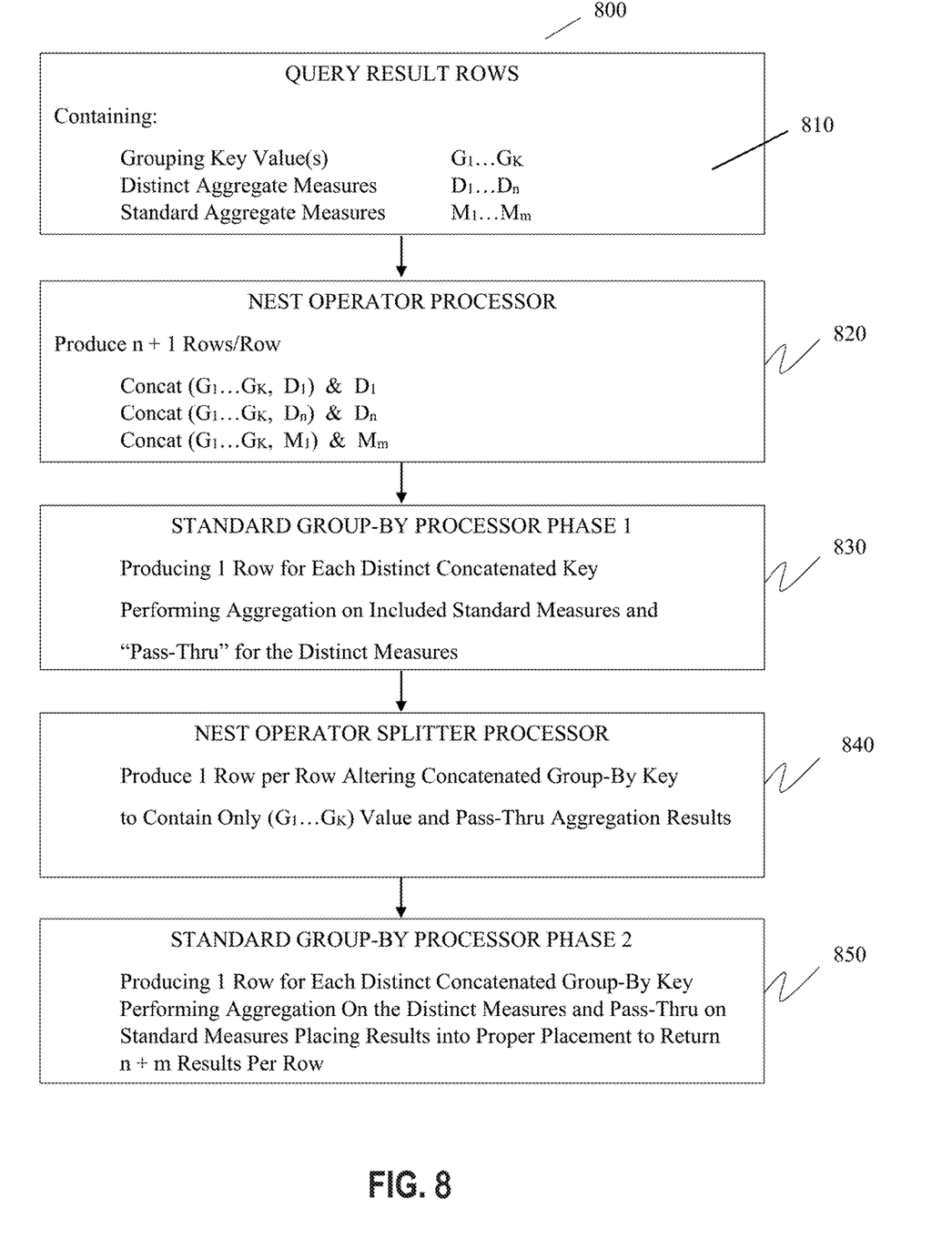
FIG. 8 illustrates a block diagram of a system for processing, according to one embodiment.

FIG. 8 illustrates a block diagram of a system for processing, according to one embodiment. In one example, the query rows 810 are assumed to flow through the device 800 from a query process where the rows containing k grouping key columns $G_1$ through $G_k$, n distinct aggregate measure values $D_1$ through $D_n$, and m standard (non-distinct) aggregate measures $M_1$ through $M_m$. The following examples are described for ease of understanding and are not limiting for the embodiments.

In one example, the nest operator processor 820 performs a replication of rows creating n+1 rows for each input row where the rows contain a concentrated key used by the group-by processing and one or more measures used for aggregation. The first set on n rows puts together the grouping key columns $G_1$ through $G_k$ along with each distinct aggregate measure $D_x$ individually as the concatenated key, where x would range from 1 to n. The same aggregate measure $D_x$ would be included as the single aggregate measure for that row. The last row puts together the grouping key columns $G_1$ through $G_k$ as the concatenated key and includes the standard measures $M_1$ through $M_m$ as the aggregate measures.

In one example, a standard group-by processor 830 performs phase 1 grouping on the concatenated key and performs aggregation. Here the aggregation for the distinct aggregate rows would be specific to what was specified by the query while the aggregation for the standard aggregate measures would be a simple pass-through of the measures. This group-by process would result in one row being produced for each distinct value of the concatenated key.

In one example, the nest operator splitter processor 840 performs a dissection of the concatenated key and produces a new concatenation with only the grouping key columns $G_1$ through $G_k$ present leaving the included resultant aggregation produced by the group-by processor 830. No change is made to the number of rows during this process.

In one example, a standard group-by processor 850 performs phase 2 grouping on the concatenated key and performs aggregation. Here the aggregation for the distinct aggregate rows would be a simple pass-through of the measures while the aggregation for the standard aggregate measures would be specific to what was specified by the query. This group-by process would result in one row being produced for each distinct value of the concatenated key but would perform a columnar placement of each resultant aggregation specific to the request in the query.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for efficient multiple aggregation distinct processing, the computer program product comprising a non-transitory computer readable storage medium having program instructions embodied therewith, the program instructions executable by a processor to cause the processor to:

convert, by the processor, a query process with multiple aggregation distincts that simultaneously performs the multiple aggregation distincts, into a single two-stage group-by process based on using an N-ary multi-valued user defined function that uses a nest operator to reduce memory consumption in a computing system, the two-stage group-by process including further program instructions to cause the processor to:

perform a first stage group-by process that obtains a group-by result by using the N-ary multi-valued user defined function that nests input fields for aggregation distincts with the nest operator into separate rows such that the first stage group-by process takes as input a single input row, and concatenating a grouping key with a measure value for each aggregation distinct, along with an indicator of which measure is included for the measure, that forms multiple inputs to a single group-by table, wherein the first stage group-by-process is performed on original grouping columns, plus the concatenation; and perform, at the end of the first stage group-by processing, a second stage group-by process on the group-by result using the N-ary multi-valued user defined function that uses the nest operator bringing together entries for each original group.

2. The computer program product of claim 1, wherein the concatenating further includes concatenating the grouping key with the measure value and the indicator of which measure is included for the measure.

3. The computer program product of claim 1, wherein the second stage group-by process is performed on the original grouping columns alone to bring together entries for each original group.

4. The computer program product of claim 1, wherein a particular row of the input is aggregated into multiple groups based on a number of data groups in the input, and both of the first stage group-by process and the second stage group-by process are performed with parallel processing.

5. The computer program product of claim 1, wherein the first stage group-by process is optimized by partitioning across parallel nodes by clustering elements by the group values for improving efficiency for the second group-by stage, and both of the first stage group-by process and the second stage group-by process are performed with map-reduce processing.

6. The computer program product of claim 1, wherein the single group-by table comprises a hash table, and the query process with the multiple aggregation distincts is reduced to a single, two-stage group-by process, by the conversion of the query process.

7. A method for efficient multiple aggregation distinct processing, comprising:
   receiving, a query process with multiple aggregation distincts that simultaneously performs the multiple aggregation distincts; and
   converting, by a processor, the query process into a single two-stage group-by process based on using an N-ary multi-valued user defined function that uses a nest operator to reduce memory consumption in a computing system, the converting comprising:
      performing, by the processor, a first stage group-by process that obtains a group-by result by using the N-ary multi-valued user defined function that nests input fields for aggregation distincts with the nest operator into separate rows such that the first stage group-by process takes as input a single input row, and concatenating a grouping key with a measure value for each aggregation distinct, along with an indicator of which measure is included for the measure, that forms multiple inputs to a single group-by table, wherein the first stage group-by-process is performed on original grouping columns, plus the concatenation; and
      performing, by the processor, at the end of the first stage group-by processing, a second stage group-by process on the group-by result using the N-ary multi-valued user defined function that uses the nest operator bringing together entries for each original group.

8. The method of claim 7, wherein the concatenating further includes concatenating the grouping key with the measure value and the indicator of which measure is included for the measure.

9. The method of claim 7, wherein the second stage group-by process is performed on the original grouping columns alone to bring together entries for each original group.

10. The method of claim 7, wherein a particular row of the input is aggregated into multiple groups based on a number of data groups in the input, and both of the first stage group-by process and the second stage group-by process are performed with parallel processing.

11. The method of claim 7, wherein the first stage group-by process is optimized by partitioning across parallel nodes by clustering elements by the group values for improving efficiency for the second group-by stage, and both of the first stage group-by process and the second stage group-by process are performed with map-reduce processing.

12. The method of claim 7, wherein the single group-by table comprises a hash table, and the query process with the multiple aggregation distincts is reduced to a single, two-stage group-by process, by the conversion of the query process.

13. An apparatus comprising:
   a memory including instructions; and
   one or more processors are configured to execute the instructions comprising conversion of a query process with multiple aggregation distincts that simultaneously performs the multiple aggregation distincts into a single two-stage group-by process based on using an N-ary multi-valued user defined function that uses a nest operator to reduce memory consumption in a computing system, wherein the one or more processors are further configured to:
      perform a first stage group-by process that obtains a group-by result by using the N-ary multi-valued user defined function that nests input fields for aggregation distincts with the nest operator into separate rows such that the first stage group-by process takes as input a single input row, and concatenating a grouping key with a measure value for each aggregation distinct, along with an indicator of which measure is included for the measure, that forms multiple inputs to a single group-by table, wherein the first stage group-by-process is performed on original grouping columns, plus the concatenation; and
      perform, at the end of the first stage group-by processing, a second stage group-by process on the group-by result using the N-ary multi-valued user defined function that uses the nest operator bringing together entries for each original group.

14. The apparatus of claim 13, wherein the concatenating further includes concatenating the grouping key with the measure value and the indicator of which measure is included for the measure.

15. The apparatus of claim 13, wherein the second stage group-by process is performed on the original grouping columns alone to bring together entries for each original group.

16. The apparatus of claim 13, wherein a particular row of the input is aggregated into multiple groups based on a number of data groups in the input, and both of the first stage group-by process and the second stage group-by process are performed with parallel processing.

17. The apparatus of claim 13, wherein the first stage group-by process is optimized by partitioning across parallel nodes by clustering elements by the group values for improving efficiency for the second group-by stage, the query process with multiple aggregation distincts is reduced to a single, two-stage group-by process, by the conversion of the query process, and both of the first stage group-by process and the second stage group-by process are performed with map-reduce processing.

* * * * *